April 22, 1969

G. E. FRIG 3,440,602

SEAT BELT TENSION INDICATOR

Filed April 26, 1966

INVENTOR.
Gerald E. Frig
BY Paul Fitzpatrick
ATTORNEY 3,440,602
SEAT BELT TENSION INDICATOR
Gerald E. Frig, Warren, Mich., assignor to General Motors Corporation, Detroit, Mich., a corporation of Delaware
Filed Apr. 26, 1966, Ser. No. 545,432
Int. Cl. B60q 9/00
U.S. Cl. 340—52      2 Claims

ABSTRACT OF THE DISCLOSURE

A triangular ring attached to a seat belt is passed through the eyelet of an eyebolt secured to the floor pan of a vehicle. Pivotally attached to the eyelet and located between the triangular ring and the eyelet is the actuator of a normally closed switch electrically connected to an indicating light and the ignition switch. If the ignition switch is on and the occupant is not using his seat belt, the switch operates the indicating light to remind the occupant to fasten his seat belt. When the seat belt is fastened, the triangular ring presses the actuator of the switch against the eyelet, opening the switch and extinguishing the light.

---

This invention relates to an automobile safety seat belt system with a tell-tale indicator. More particularly, this invention relates to a safety seat belt assembly for use in an automobile that includes an electrical switch being operative in conjunction with the ignition system of the automobile to light a tell-tale lamp when the seat belt is not tightened around the occupant in the automobile.

The installation of safety seat belts in automobiles has become mandatory by law. The purpose of the safety seat belt in an automobile is, of course, to reduce personal injury resulting from automobile accidents. Although, most automobiles today have seat belts installed therein, the occupants of the automobile, nevertheless, frequently fail to fasten their seat belts on many occasions, and particularly on short trips such as are normally experienced in city driving.

The present invention provides an electrical switch which operates an indicating lamp when the ignition system of the car is turned on so as to indicate whether the seat belts are being used properly by the occupants of the vehicle.

Other objects, features and advantages of the present invention will become obvious upon reference to the following detailed description and the drawings depicting the preferred embodiments thereof, wherein.

Figure 1:
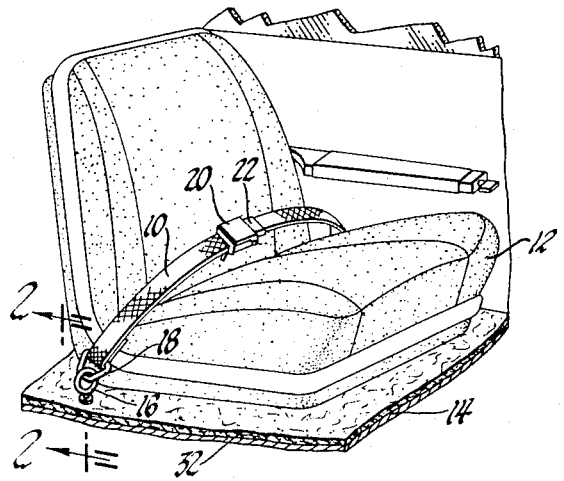
FIGURE 1 is a schematic view of a seat belt assembly used in conjunction with a vehicle seat.

Generally, FIGURE 1 shows a seat belt assembly 10 as used in conjunction with a vehicle seat 12 which is secured to a vehicle floor pan 14. The seat belt assembly 10 is also secured to the vehicle floor pan 14 by means of an eyebolt 16 and triangular ring 18. The seat belt assembly 10 may be of any suitable type such as one having a buckle 20 and latch plate 22 which are fixed on the ends of two lengths of belt and which engage each other in front of the user. The seat belt anchor assembly including the eyebolts 16 and the triangular ring 18 can be seen in more detail in FIGURE 2. The eyebolt 16 may be of any suitable standard type having a circular eyelet 24, a shank 26, and a nut 28 which is threaded on the lower end of the shank 26 which is seen to pass through the floor pan 14 and is secured thereto by means of a washer 30 and the threaded nut 28. The floor pan 14, of course, can be covered with a layer of carpeting 32 which also serves to cover a portion of the shank 26 of the eyebolt 16.

Figure 2:
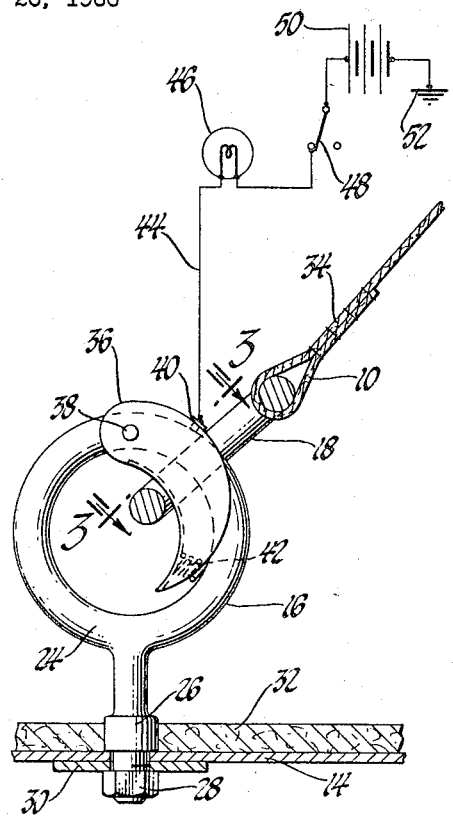
FIGURE 2 is a view taken in the plane of lines 2—2 in FIGURE 1 with the addition of a schematic electrical diagram.
Figure 3:
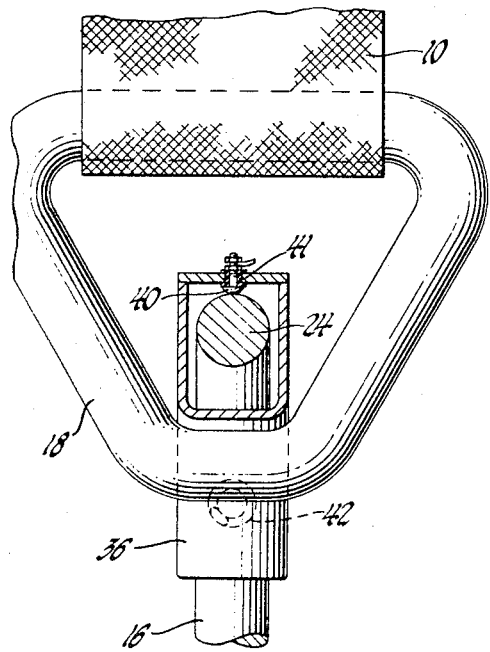
FIGURE 3 is a view taken in the plane of lines 3—3 in FIGURE 2 with parts in section.

The triangular ring 18 can best be seen in FIGURE 3. The seat belt 10 is looped around one side of the triangular ring 18 and secured to itself at 34. The opposite corner of the triangular ring 18 is positioned within the circular eyelet 24 of the eyebolt 16 to thereby anchor the seat belt to the floor pan 14. The ring 18 may be split at some point and welded together after insertion through eyelet 24. A switch member or operating arm 36 is pivotally mounted at 38 to the circular eyelet 24 between the triangular ring 18 and the eyelet 24. The switch member 36 mounts an electrical contact 40 which is insulated by insulation 41 from the arm and in contact with the circular eyelet 24 of the eyebolt 16 when the switch member 36 is in the position shown in FIGURE 2. A spring 42 is mounted between the free end of the switch member 36 and the eyelet 24 to normally bias the switch member 36 into the position shown in FIGURE 2 thereby putting the electrical contact 40 in contact with the eyelet 24. The electrical contact 40 is connected by means of electrical wiring 44 to an indicating lamp 46 which is in turn connected to the ignition switch 48 and the vehicle's electrical source 50 which is grounded at 52. Thus, when the ignition switch 48 is turned to the "on" position (as shown in FIGURE 2) and the contact 40 is in contact with the eyebolt 16 the circuit is completed and the indicating lamp 46 will light.

Figure 4:
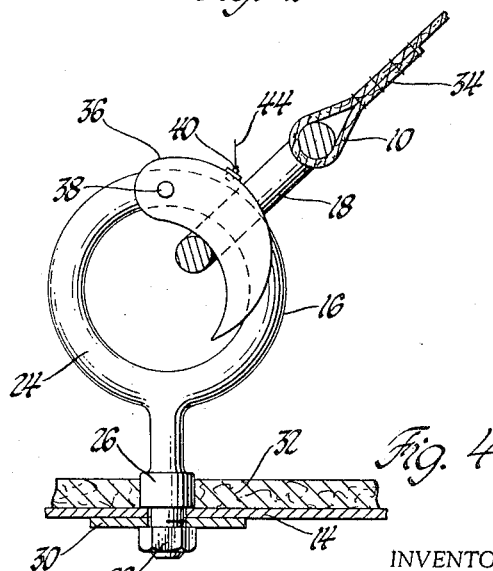
FIGURE 4 is the same view as FIGURE 2 showing the electrical switch in the open position.

When the seat belt 10 is in use and the proper tension has been applied to it, the triangular ring 18 will move the electrical switch member 36 against the force of the spring 42 thereby removing the electrical contact 40 from any contact with the eyebolt 16 so as to open the circuit and turn off the indicating lamp 46. Thus, when the seat belt is properly used by the occupant the assembly will take the position shown in FIGURE 4 and the indicator lamp will not be lit.

It should be understood then that whenever the ignition switch 48 is turned on and the seat belt is not in proper use by the occupant, the indicating lamp 46 will light thereby reminding the occupant to fasten his seat belt. Once the proper tension has been applied to the seat belt, the switch member 36 breaks the circuit to the indicating lamp 46 thereby turning it off. Hence an indicating device is provided by this invention which will provide a reminder to the occupants of a vehicle to fasten their seat belts and to wear them properly so as to result in the proper tension on the belt to turn off the indicating lamp. This system will overcome the many problems associated with non-usage of seat belts by occupants of vehicles.

Although but one embodiment of the subject invention has been described and shown in detail, it should be clear to those skilled in the art to which the invention pertains that many changes and modifications may be made thereto without departing from the scope of the invention.

I claim:

1. An indicating device for a vehicle having an ignition switch, a support member, and a restraint belt assembly comprising: anchor means secured to said support member, fastening means attached to said belt assembly and engageable with said anchor means upon occupant use of the seat belt assembly, indicating means mounted in said vehicle and electrically connected to said ignition switch, switch means electrically connected to said indicating means and said ignition switch across a source of power, the switch means including an actuator located between said anchor means and said fastening means, said actuator being operated by said fastening means upon engagement with said anchor means to operate said switch means and said indicating means.

2. An indicating device for a vehicle having an ignition switch, a support member and a restraint belt assembly comprising: an eyebolt secured to said support member, a ring attached to said belt assembly and extending through said eyebolt, said ring being engageable with said eyebolt upon occupant use of the seat belt, indicating means mounted to said vehicle and electrically connected to said ignition switch, normally closed switch means including an actuator located between said eyebolt and said ring, means electrically connecting the switch means to said ignition switch and to said indicating means across a source of power, closure of the ignition switch without occupant use of the belt assembly activating the indicating means to remind the occupant to use the restraint belt assembly, use of the belt assembly by the occupant pulling the ring into engagement with the eyebolt and operating the actuator to open the switch means and deactivate the indicating means.

References Cited

UNITED STATES PATENTS

| | | |
|---|---|---|
| 2,868,309 | 1/1959 | Burgess. |
| 3,226,674 | 12/1965 | Eriksson _____ 340—278 XR |
| 3,281,818 | 10/1966 | Morgan et al. _____ 340—278 |
| 3,340,523 | 9/1967 | Whitman _____ 340—52 XR |

ALVIN H. WARING, *Primary Examiner.*

U.S. Cl. X.R.

180—82; 280—150